United States Patent [19]

Alpers

[11] 4,194,204

[45] Mar. 18, 1980

[54] HIGH RESOLUTION MICROWAVE SEEKER

[75] Inventor: Frederick C. Alpers, Riverside, Calif.

[73] Assignee: The United States of America as represented by the Secretary of the Navy, Washington, D.C.

[21] Appl. No.: 260,703

[22] Filed: Jun. 5, 1972

[51] Int. Cl.² .......................... G01S 9/22; G01S 9/233
[52] U.S. Cl. .................................. 343/7.4; 343/5 CE; 343/16 M; 343/17.2 PC
[58] Field of Search .............. 343/7.4, 16 M, 17.2 PC, 343/5 CE

[56] References Cited
U.S. PATENT DOCUMENTS 3,189,900  6/1965  Raabe ................................. 343/16 M
3,806,929  4/1974  Moore ............................ 343/5 CE X
3,878,525  4/1975  Alpers ....................... 343/17.2 PC X

*Primary Examiner*—T. H. Tubbesing
*Attorney, Agent, or Firm*—R. S. Sciascia; G. J. Rubens; T. M. Phillips

[57] ABSTRACT

An active microwave seeker for missile guidance against ships or permanent land targets. Frequency agility and pulse time compression are employed as means to provide a capability for tracking small targets in heavy sea clutter, to reduce target angular scintillation, and to reduce susceptibility to enemy jamming. The seeker tracks a selected target in yaw and range, and keeps its antenna pointed toward the target in pitch by use of its own altitude control.

8 Claims, 5 Drawing Figures

HIGH RESOLUTION MICROWAVE SEEKER

BACKGROUND OF THE INVENTION

The present invention relates to missile seekers of the active microwave class, those which actively generate a microwave signal and propagate that signal in the direction of the missile target and then utilize the resulting echo signal to derive directional information for homing purposes. Conventional seekers are limited in tracking small ship targets in a high sea clutter environment. This is because the maximum effective range is inversely proportional to the effective transmitted pulse width.

SUMMARY OF THE INVENTION

The present invention provides an active microwave missile seeker wherein an agile Ku-band transmitter signal is derived by mixing an X-band signal that is randomly stepped in frequency on a cycle-to-cycle basis with a C-band signal that is intra-pulse modulated or "chirped", and then amplifying the Ku-band component with a high gain traveling wave amplifier tube (TWT).

OBJECTS OF THE INVENTION

An object of the invention is the provision of an active microwave seeker wherein the transmitter and local oscillator signals are synthesized so as to provide random pulse-to-pulse frequency agility without a consequent tuning problem.

Another object of the invention is to provide for a novel manner of processing the monopulse sum and yaw channel signals through the same dispersive delay line to reduce cost and eliminate the problem of matching the delays of two delay lines.

A further object is the provision for shorting the actual transmitter pulse width in the terminal phase so as to allow operation at a much reduced range which allows for "last second" range and yaw correction.

Still another object is the provision for controlling the antenna pitch angle through the use of seeker-derived altitude and range data.

Other objects and many of the attendant advantages of this invention will be readily appreciated as the same becomes better understood by reference to the following detailed description when considered in connection with the accompanying drawings.

DESCRIPTION OF THE PREFERRED EMBODIMENTS

Figure 1:
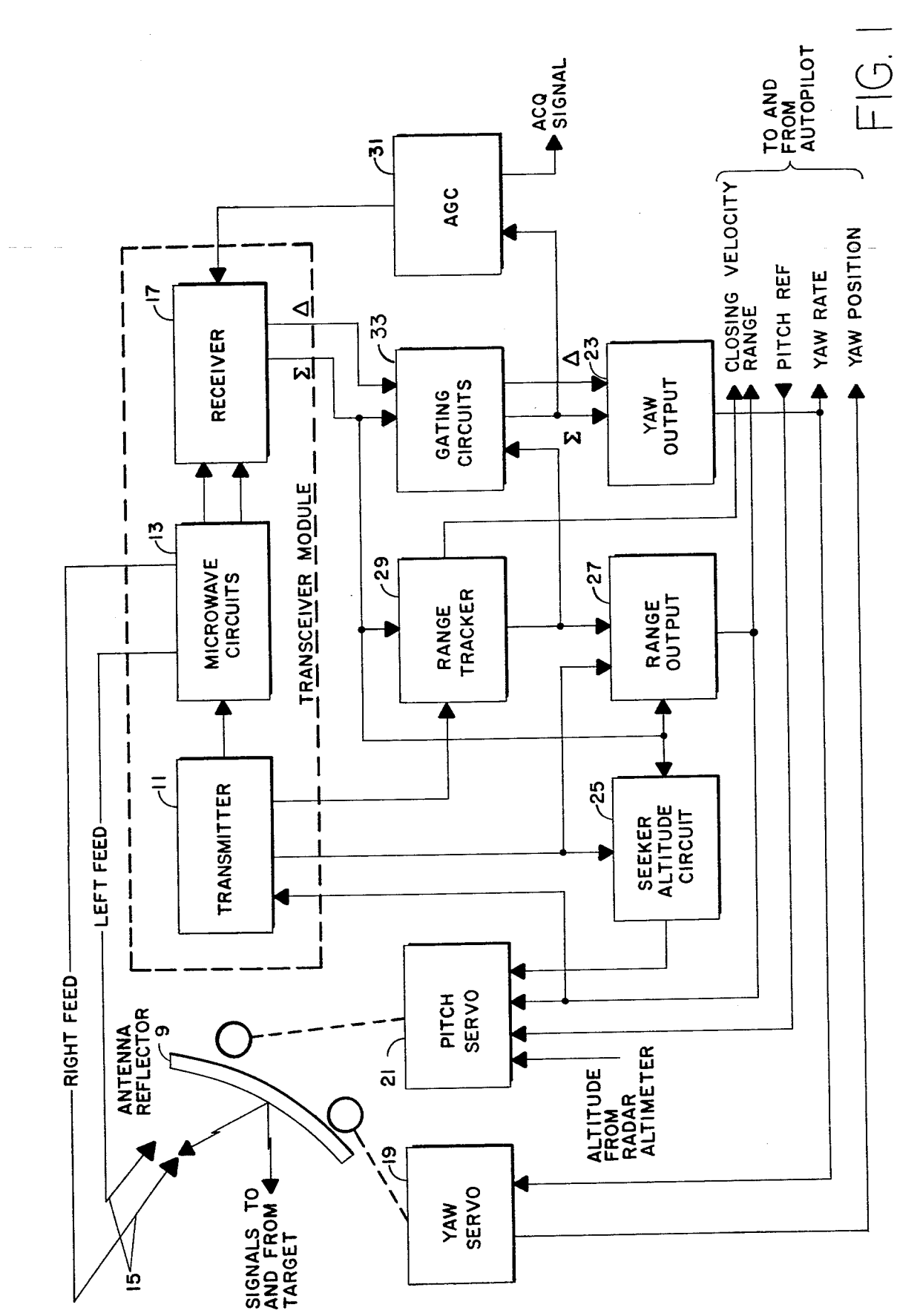
FIG. 1 is an overall block diagram of a target seeker embodying the present invention.

Referring now to the drawings wherein there is shown in FIG. 1 a dual feed antenna 9 for transmitting and receiving microwave signals to and from a target (not shown). Transmitter 11 provides microwave energy that is fed to antenna 9 through appropriate microwave circuits 13 and antenna feeds 15. Reflected signals from a target are fed to receiver 17 which provides sum and difference signals for processing. Antenna 9 is controlled in yaw and pitch by yaw and pitch servo controls 19 and 21, respectively. Yaw servo 19 is controlled by the signal from yaw output circuit 23. Pitch servo 21 is controlled by input signals from altitude circuit 25, range output circuit 27, a pitch reference signal from the autopilot and the radar altimeter. Range tracker 29 provides range gate signal to range output circuit 27, gating circuits 33 and the closing velocity signal to the autopilot. The threshold of operation for receiver 17 is controlled by AGC circuit 31. Timing pulses for range tracker 29, range output 27, and altitude circuit 25 are provided by the timing circuit of transmitter 11.

Figure 2:
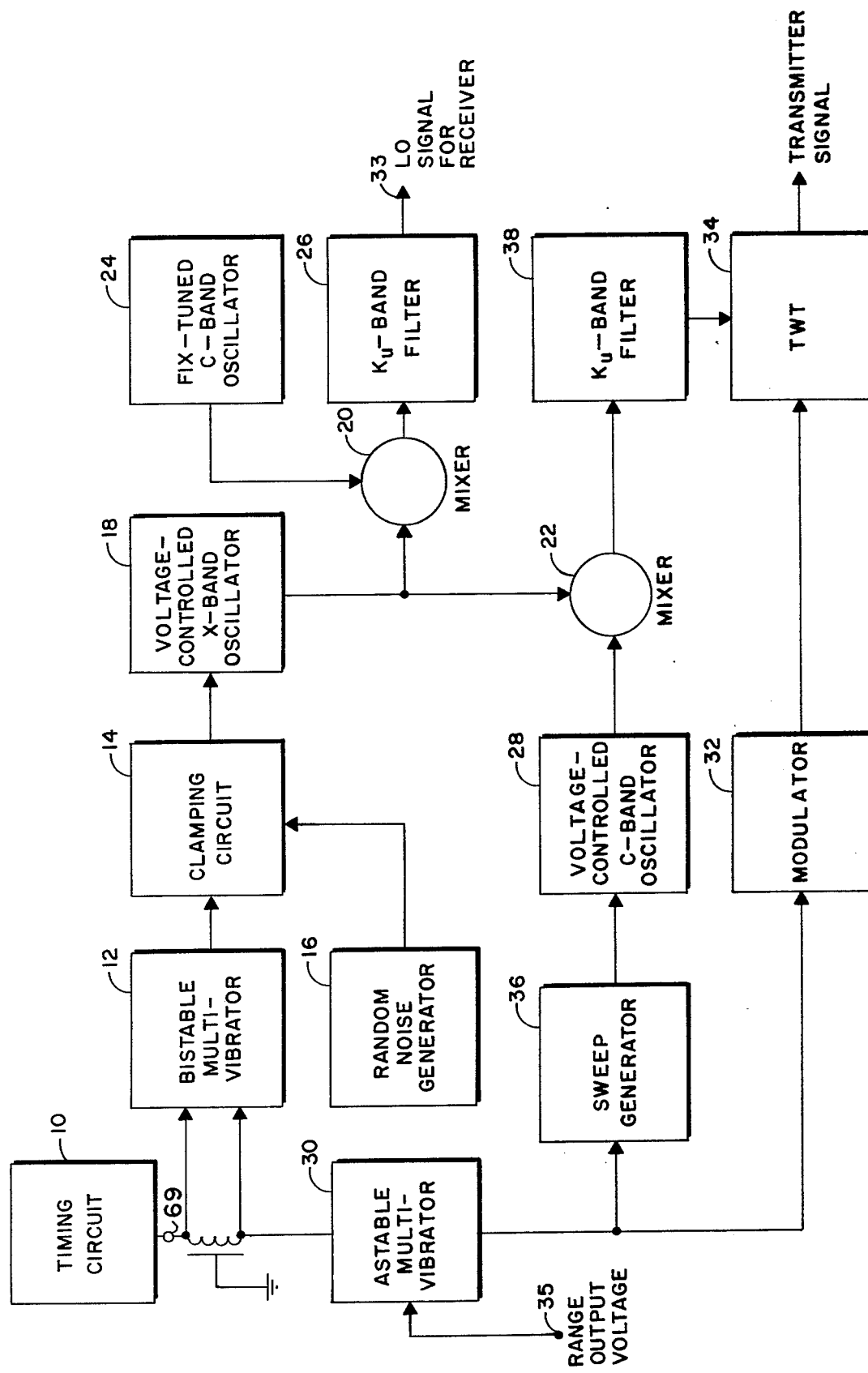
FIG. 2 is a block diagram of the transmitter portion of the embodiment of FIG. 1.

Referring to FIG. 2, functioning of transmitter 11 begins with a trigger pulse supplied by the timing circuit 10. Timing circuit 10 should be designed to provide pulses with a randomly jittered PRF and may be of the type shown and described in copending application Ser. No. 210,263, filed Dec. 17, 1971, now U.S. Pat. No. 3,813,670. The timing pulse is fed directly to and through a delay line to provide first and second inputs to bistable multivibrator 12 (a flip-flop circuit) where the action of the preceding PRF cycle is switched off or the multivibrator reset, and then, after a short delay, multivibrator 12 is again activated. Multivibrator 12 controls clamping circuit 14 which may be of the box-car detector type and serves to store the output voltage of random noise generator 16 at the instant that the delayed timing pulse arrives at the second input to multivibrator 12. The random voltage thus sampled by clamping circuit 14 is applied to the frequency control electrode of an X band (~10 GHz) oscillator 18. Oscillator 18 may be a backward wave oscillator (BWO) or other suitable device that will provide a frequency variation of 400 MHz or more in consonance with a variation in its control voltage. The randomly stepped X-band signal that results is applied to two mixers 20, 22. In mixer 20, the X-band signal is heterodyned with a fix-tuned C-band (~6 GHz) signal from oscillator 24, resulting in heterodyning products that include a randomly stepped $K_u$-band (10+6=16 GHz) signal that can be singled out by filtering in filter 26 and provides the receiver local oscillator signal at terminal 33.

In the other mixer 22 the X-band signal from oscillator 18 is heterodyned with a C-band chirped signal from oscillator 28. By presetting the C-band oscillator 24 to a frequency that is displaced from the mean frequency of the chirped C-band signal from oscillator 28 by an amount equal to the receiver IF, proper local oscillator signal tuning is assured despite the random cycle-to-cycle frequency changes in the signal derived for transmission purposes.

In addition to triggering bistable multivibrator 12, the delayed pulse from timing circuit 10 triggers an astable ("one shot") multivibrator 30 that establishes the transmitter pulse width which is established by using the output of multivibrator 30 as the input to a high voltage modulator circuit 32 that in turn pulses TWT 34. Multivibrator 30 flips to an ON condition when triggered, and automatically returns to an OFF condition after a nominal short interval (approximately 4.0 μsec), although it will be switched OFF still more quickly if the seeker range output voltage indicates a target range that is equivalent to an even shorter interval. This variability is achieved by connecting at terminal 35 the seeker range voltage (from FIG. 1) to the astable multivibrator 30 control. Its purpose, as will become apparent, is to reduce the effective minimum range of the seeker by shortening the transmitter pulse at very short range so that the trailing portion of the transmitter pulse that inherently leaks into the receiver will not coincide with and thereby obscure the relatively weak target signal. This shortening of the chirped transmitter pulse has the side effect of reducing the effective transmitter power, which is acceptable at short range, but does not adversely affect the range measurement or other vital functions of the seeker. In addition to controlling modulator 32, the output of astable multivibrator 30 also governs the operation of sweep generator 36 for the C-band chirped signal. When the multivibrator 30 output is at full width (4 $\mu$sec), the sweep generator 36 provides an output signal sufficient to provide a full chirp modulation ($\sim$100 MHz) on the C-band signal, and hence on the $K_u$-band transmitter pulse from TWT 34. The output from mixer 22 is fed through a $K_u$-band filter 38 to TWT 34. When the multivibrator 30 pulse width is reduced to decrease the minimum range, the sweep is simply shortened and the extent of the chirp modulation reduced accordingly without changing the sweep rate ($\sim$25 MHz/$\mu$sec). This approach obviates changing the receiver circuitry simultaneously with the transmitter pulse width.

Figure 3:
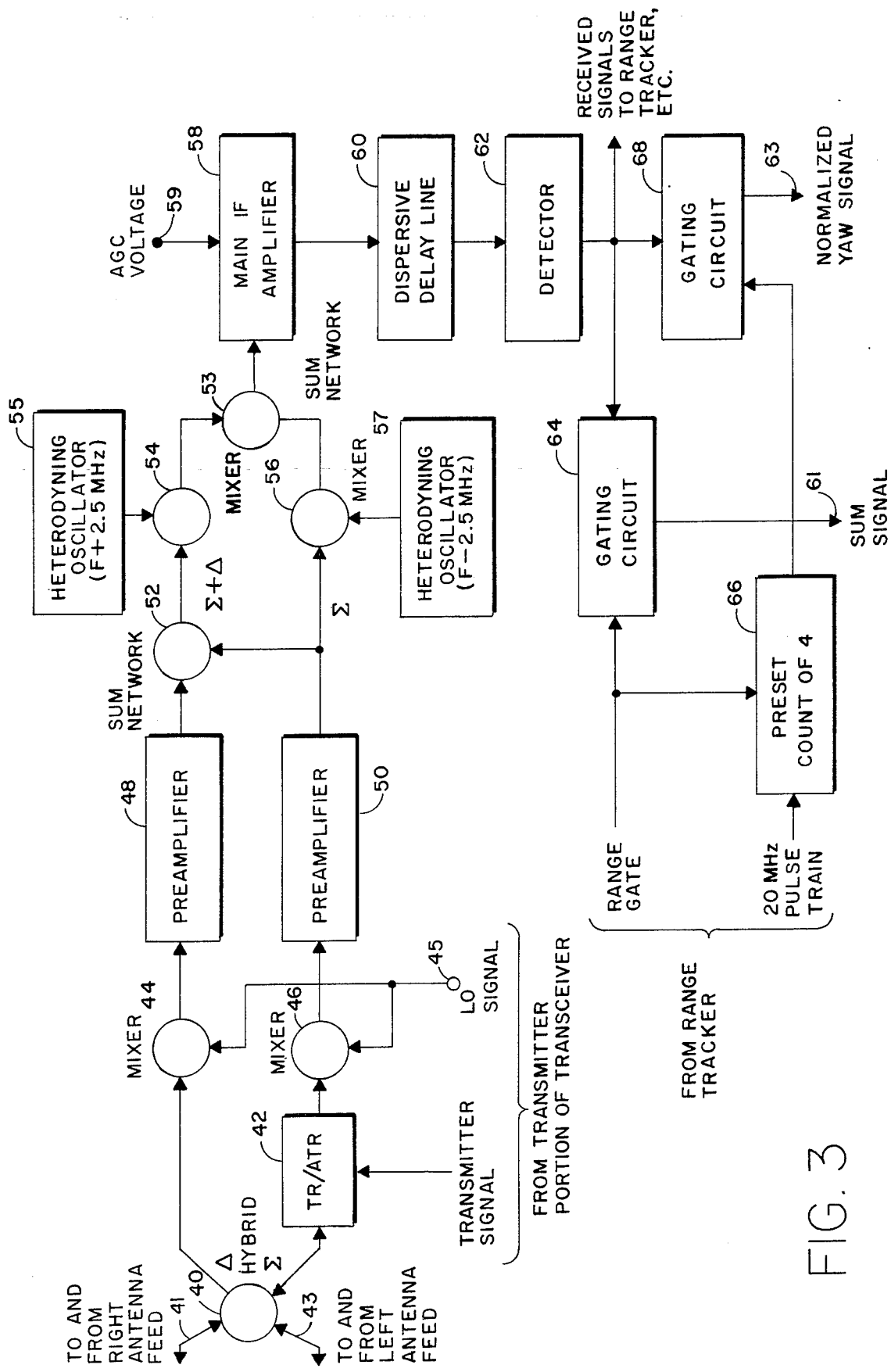
FIG. 3 is a block diagram of the receiver and related circuits of the embodiment of FIG. 1.

Overall functioning of receiver 17 may be had by referring to FIG. 3. The $K_u$-band transmitter signal coming from the TWT 34 (FIG. 2) is fed to microwave hybrid 40 by TR/ATR 42 switching action, and is split equally between the right and left antenna feeds 41, 43. This results in sumpattern propagation toward the target. The returning echo signal is split into the familiar monopulse sum ($\Sigma$) and difference ($\Delta$) signals by the hybrid 40. As is customary with amplitude comparison processing, the difference signal reaches a null when the target lies on the antenna axis, and otherwise indicates by its amplitude the magnitude and by its phase the direction of any yaw displacement from this axis. The difference signal goes directly to a $K_u$-band mixer 44, while the sum signal goes to a corresponding mixer 46 via TR/ATR circuits 42. In each of mixers 44 and 46 the two signals are converted to IF signals by heterodyning with the $K_u$-band L.O. signal at input terminal 45 supplied by the transmitter (FIG. 2) portion of the transceiver. A center frequency of 800 MHz has been found to be satisfactory for the IF signals. Before further processing, IF difference signals and IF sum signals are amplified by preamplifiers 48 and 50, respectively, with a gain on the order of 20 db to bring them well above noise level (unless the difference signal is exactly at its null). After preamplification, the IF difference signal is vectorially added in sum network 52 to the IF sum signal to produce a sum-plus-difference ($\Sigma+\Delta$) signal, hereafter referred to as the yaw signal, that has the same amplitude as the sum signal when the target is on axis and has a greater or lesser amplitude when the target is off to one side or the other. As has been found in the design of monopulse seekers for antiradar missiles, the use of such a compound yaw signal in lieu of a simple difference signal avoids difficulties in identically processing signals of widely different levels in the important case where a small remaining guidance error is to be corrected.

The 800 MHz IF sum and yaw signals are next heterodyned in IF mixers 54, 56 to reduce them to lower frequencies and then added in sum network 53 before further amplification. The purpose of this step is to separately identify the two simultaneous signals so that they may be multiplexed through the same main IF amplifier 58 and dispersive delay line 60, and then later reseparated. The identification is accomplished by using two different heterodyning oscillators 55, 57 having signals (F+2.5 MHz and F−2.5 MHz, respectively) which result in sum and yaw signals that are separated in instantaneous frequency by 5 MHz. Since the chirp modulation that is present on each echo signal is 100 MHz, the 5 MHz separation does not prevent the respective signals from greatly overlapping each other's frequency bands. With F, the nominal heterodyning frequency, selected to be 500 MHz, the center frequency of both of the resultant multiplexed signals will be approximately 300 MHz, and this is therefore the center frequency specified for amplifier 58 and delay line 60. As was previously indicated, this multiplexing scheme not only avoids the requirement for a second IF amplifier and delay line, but also avoids all the matching problems that would be encountered if two parallel channels were required. In addition, the multiplexing affords an opportunity to normalize the amplitude of the yaw signal to that of the sum signal. This is done by deriving an automatic gain control (AGC) action that is based solely on the sum signal and applying this AGC to both signals (input terminal 59) as they pass through the main IF amplifier 58. Amplification must be accomplished prior to time compression of the signals which could reduce unamplified signals below receiver noise levels.

The 400:1 time compression action of dispersive delay line 60 reduces the overlapping 4 $\mu$sec signals that occur in the familiar increasing-range sequence of a conventional radar. The output pulses from delay line 60 are then converted to video signals by a diode detector 62. Since the input yaw signals occur at a frequency that is 5 MHz above the corresponding sum signals, the delay line delays the yaw signals by $$5 \text{ MHz}/100 \text{ MHz} \times 4.0 \text{ } \mu\text{sec} = 0.2 \text{ } \mu\text{sec}$$

more than the sum signals. This is equivalent to a 100 ft. separation in range, which provides a favorable separation to avoid any significant likelihood of the yaw signal overlapping a sum signal from a longer range portion of the same target. The precise 0.2 $\mu$sec separation of the yaw signal from the corresponding sum signal thus serves to identify the one with respect to the other, and time gating is used to reseparate the two at the output of detector 62 (gating circuit 33, FIG. 1). A 0.01 $\mu$sec wide range gate which may be provided by the range tracker is fed to gating circuit 64 to gate the target sum signal to output terminal 61, and a similar gate from preset counter 66 is fed to gating circuit 68 for gating the corresponding yaw signal precisely 0.2 $\mu$sec later to output terminal 63. Preset counter 66 may consist of several flip-flops and a gate generator connected in series. Timing of the counter gate is established by keying the preset counter with the tracker-supplied range gate and then counting out to the fourth subsequent pulse in a 20 MHz pulse train. (Derivation of these range tracker pulses is described in the above referenced copending application.)

Figure 4:
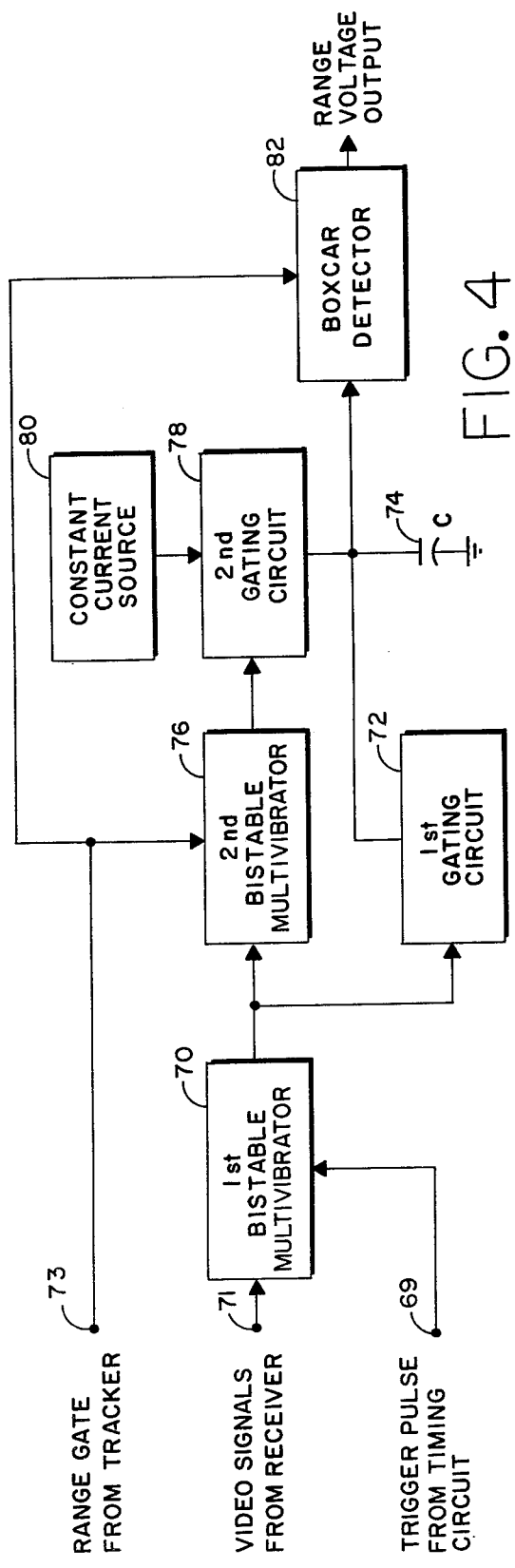
FIG. 4 is a block diagram of the range output circuit.

The memory circuit in range tracker 29 provides an output voltage proportional to range rate (missile closing velocity), but not a voltage indicative of the range itself. The latter is provided by range output circuit shown in FIG. 4.

Functioning of the range output circuit in each PRF cycle begins with the arrival of the trigger pulse at terminal 69 from timing circuit 10 (FIG. 2). This activates bistable multivibrator 70 which is then switched off by the leading edge of the first pulse received at terminal 71 (the seeker transmitter signal) that occurs at the receiver output subsequent to the trigger pulse. The "on" cycle of multivibrator 70 provides a gate signal that activates gating circuit 72 to remove any residual voltage from capacitor 74. In addition, the trailing edge of the output of multivibrator 70 serves to trigger a second multivibrator 76 which is then switched off by the leading edge of the range gate provided by the target tracker at terminal 73. Since the range gate present at terminal 73 is maintained in coincidence with the selected target signal by the range tracker action, the result is an "on" cycle for the second multivibrator 76 that begins precisely with the transmitter signal and ends precisely with the target signal, both of which are taken from the same point in the receiver so that dispersive delay line or other circuit delays do not bias the range measurement. This "on" cycle then activates a second gating circuit 78, allowing a constant current source 80 to charge capacitor 74 for the duration of the gate. The peak voltage attained across capacitor 74 is detected by boxcar detector 82. The range gate signal is also coupled to boxcar detector 82 to clear the prior output so that the value of the new peak voltage will be detected. The dc voltage from detector 82 is directly proportional to the duration of the charging cycle of capacitor 74 and this in turn is governed by the "on" cycle of second multivibrator 76 and hence is directly proportional to target range. The proportionality constant is determined by the size of the capacitor and the amount of constant current supplied, which means that scale changes can readily be accomplished during flight if desired.

Figure 5:
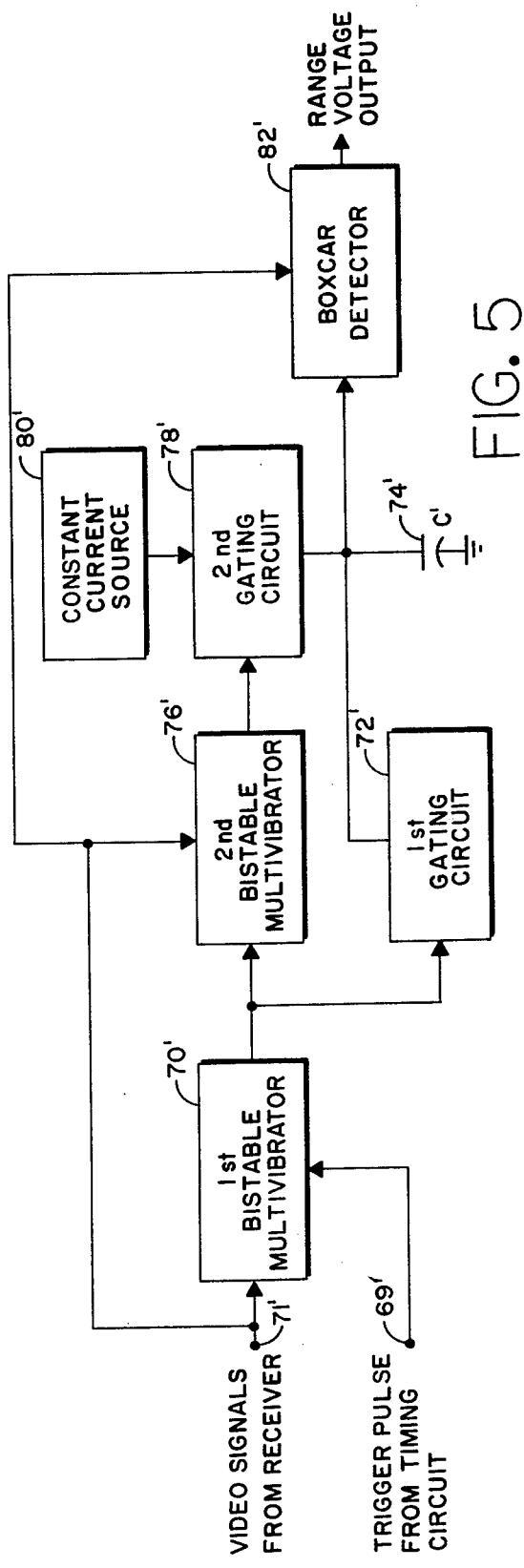
FIG. 5 is a block diagram of the seeker altitude circuit.

In order to provide target information in the pitch plane, i.e., keep the seeker antenna 9 pointed at the optimum depression angle when the missile is other than near-sea-level altitude, altitude and range data are utilized as shown in the pitch control circuit of FIG. 1. The circuit of FIG. 5 for deriving an altitude voltage is the same as the range circuit of FIG. 4 except that multivibrator 76' is switched off with the first video signal to be received following the transmitter pulse. The first video signal is derived from transmitter side lobe radiation that strikes the sea directly below the missile and is reflected back into the seeker receiver. The dc voltage at the output of boxcar detector 82' is then directly proportional to the time interval between the transmitter pulse and the altitude signal. This interval is a direct measure of altitude.

As shown in FIG. 3 output gating circuits 64 and 68 provide sum and yaw signal pulses, respectively, that are separated by 0.2 μsec. These signals are fed to a yaw output circuit 23 (FIG. 1) which converts the pulse signals into a control voltage for yaw servo 23. Yaw output circuit 23 may comprise boxcar detection for converting the pulse signals to dc voltages which can then be compared in a differential amplifier.

Obviously many modifications and variations of the present invention are possible in the light of the above teachings. It is therefore to be understood that within the scope of the appended claims the invention may be practiced otherwise than as specifically described.

What is claimed is:
1. In a high resolution microwave seeker, the combination comprising:
    (a) antenna means for transmitting and receiving microwave signals in the direction of a target of interest,
    (b) microwave transceiver means coupled to said antenna means for supplying signals controlled in pulse width and frequency for transmission and for processing received signals to generate a normalized yaw control signal,
    (c) yaw control circuit means coupled to said transceiver and to said antenna for controlling the aim point of said antenna in the yaw plane,
    (d) pitch control circuit means including range and altitude circuit means coupled to said transceiver and to said antenna for controlling the aim point of said antenna in the pitch plane.
2. The seeker of claim 1 wherein the transmitter portion of said transceiver includes:
    (a) first circuit means for generating a first signal that is randomly stepped in frequency from cycle to cycle,
    (b) second circuit means for generating a second signal that is intrapulse modulated,
    (c) mixer circuit means coupled to said first and second circuit means for mixing said first and second signals,
    (d) filter circuit means coupled to said mixer circuit means for passing signals in a selected band of frequencies as on the carrier signal for the transmitter.
3. The seeker of claim 1 wherein said transmitter portion of said transceiver includes;
    (a) a source of randomly jittered pulses,
    (b) a bistable multivibrator having a first input coupled directly to said sources and a second input coupled through a delay circuit to said source, said bistable multivibrator being reset by the pulse received at said first input and being turned on after a short delay by the pulse received at said second input,
    (c) a clamping circuit having a first input coupled to a random noise generator and a second input coupled to the output of said bistable multivibrator and being responsive to the delayed output trigger pulse from said bistable multivibrator to store a sample of said random voltage,
    (d) a first voltage controlled oscillator adapted to operate in a first frequency range coupled to said clamping circuit and generating an output signal with a frequency varying cycle by cycle in response to the random noise voltage stored in said clamping circuit,
    (d) an astable multivibrator having a first input coupled to said pulse source through said delay circuit and being responsive to the delayed pulse to generate a pulse of a predetermined duration,
    (f) a sweep generator coupled to and being responsive to the output pulse of said astable multivibrator for generating a sweep voltage proportional to the duration of the pulse,
    (g) a second voltage controlled oscillator adapted to operate in a second frequency range difference from the frequency range of said first voltage controlled oscillator, said second voltage controlled oscillator being coupled to said sweep generator and having an output signal varying in frequency,

(h) mixer circuit means having a first input coupled to the output of said first voltage controlled oscillator and a second input coupled to the output of said second voltage controlled oscillator, (i) filter circuit means coupled to the output of said mixer circuit means for passing a predetermined band of frequencies on the carrier signal for the transmitter.

4. The seeker of claim 1 wherein the receiver portion of said transceiver includes:

(a) Summing and heterodyning network circuit means for combining the sum and difference signals to produce sum and yaw signals separated in instantaneous frequency, (b) time compression circuit means coupled to the output of said summing and heterodyning circuit for time compressing said combined signals, (c) detector circuit means coupled to said compression circuit means for converting the time compressed signals into video signals, (d) gating circuit means coupled to said detector circuit means for separating said combined signals into a yaw signal and a sum signal.

5. The seeker of claim 4 wherein said summing and heterodyning circuit means includes a first heterodyning oscillator having a frequency above the nominal heterodyning frequency and a second heterodyning oscillator having a frequency below the nominal heterodyning frequency to produce combined sum and difference signals separated in frequency by 5 MHz.

6. The seeker of claim 5 wherein said time compression circuit means is a 400:1 dispersive delay line and delays the yaw signals by 0.2 $\mu$sec more than the sum signals a value equivalent to 100 ft. separation in range.

7. The seeker of claim 1 wherein said range circuit means includes:

(a) a capacitor,
(b) a constant current source,
(c) a first gating circuit coupled between said constant current source and said capacitor,
(d) second gating circuit means coupled to said first gating circuit and being responsive to the trailing edge of the transmitted signal to gate said constant current source to charge said capacitor until a target signal is received,
(e) boxcar detector means coupled to said capacitor for detecting the peak voltage attained across said capacitor which is directly proportional to range.

8. The seeker of claim 1 wherein said altitude circuit means includes:

(a) a capacitor,
(b) a constant current source,
(c) a first gating circuit coupled between said constant current source and said capacitor,
(d) second gating circuit means coupled to said first gating circuit and being responsive to the trailng edge of the transmitted signal to gate said constant current source to charge said capacitor until the first video signal is received,
(e) boxcar detector means coupled to said capacitor for detecting the peak voltage attained across said capacitor which is directly proportional to altitude.

* * * * *